(12) United States Patent
Huxter et al.

(10) Patent No.: US 7,815,258 B2
(45) Date of Patent: Oct. 19, 2010

(54) PRESENT INVENTION RELATES TO A VEHICLE SEAT SUPPORT MECHANISM

(75) Inventors: Jeffrey Mark Huxter, Chelmsford (GB); Alexander Martin Drake, Hertfordshire (GB)

(73) Assignee: Johnson Controls Technology Company, Holland, MI (US)

( * ) Notice: Subject to any disclaimer, the term of this patent is extended or adjusted under 35 U.S.C. 154(b) by 1050 days.

(21) Appl. No.: 10/468,972

(22) PCT Filed: Feb. 22, 2002

(86) PCT No.: PCT/GB02/00732

§ 371 (c)(1),
(2), (4) Date: Nov. 15, 2005

(87) PCT Pub. No.: WO02/068236

PCT Pub. Date: Sep. 6, 2002

(65) Prior Publication Data

US 2006/0119155 A1    Jun. 8, 2006

(30) Foreign Application Priority Data

Feb. 23, 2001    (GB) .................................. 0104504.6

(51) Int. Cl.
  *B60N 2/30*    (2006.01)
  *B60N 2/14*    (2006.01)
(52) U.S. Cl. ...................................... 297/324; 297/334
(58) Field of Classification Search ......... 297/331–335, 297/324; 296/65.05, 65.08, 65.09, 65.13, 296/65.16
See application file for complete search history.

(56) References Cited

U.S. PATENT DOCUMENTS

| 820,344 | A | * | 5/1906 | Brierley | ...................... 297/332 |
| 1,167,831 | A | * | 1/1916 | Kilburn | ...................... 297/244 |
| 3,093,414 | A | * | 6/1963 | Eames et. al. | ............... 297/323 |

(Continued)

FOREIGN PATENT DOCUMENTS

DE    19630214 C1 *   9/1997

(Continued)

OTHER PUBLICATIONS

Examination Report for GB 0104504.6, dated Jan. 15, 2004, 3 pages.

(Continued)

*Primary Examiner*—David Dunn
*Assistant Examiner*—Tania Abraham
(74) *Attorney, Agent, or Firm*—Foley & Lardner LLP (57) ABSTRACT

A vehicle seat having a seat cushion and a seat back which are movably connected to one another by a vehicle seat support mechanism and which are also movably mounted to a support floor by said vehicle seat support mechanism, said vehicle seat being movable between a normal in-use position and a stowed position, said stowed position being located rearwards from said normal in-use position and said seat back, when said vehicle seat is in its stowed position, being located at a relatively lower height than when said vehicle seat is in said normal in-use position. When the vehicle seat is moved to its stowed position, a seat assembly can be converted from a 3-seater to a 2-seater condition for instance.

5 Claims, 9 Drawing Sheets

U.S. PATENT DOCUMENTS

| | | | |
|---|---|---|---|
| 3,151,906 A | | 10/1964 | Roberts |
| 3,656,806 A | * | 4/1972 | Castelli et al. ............... 297/324 |
| 3,746,389 A | | 7/1973 | Fourrey |
| 3,762,764 A | | 10/1973 | McJunkin |
| 4,458,942 A | * | 7/1984 | Crossman ................... 297/332 |
| 4,460,215 A | * | 7/1984 | Chamberlain et al. ......... 297/14 |
| 4,580,832 A | * | 4/1986 | Maruyama et al. ............ 297/14 |
| 4,652,051 A | * | 3/1987 | Maruyama ................... 297/333 |
| 4,771,507 A | * | 9/1988 | Draplin et al. .............. 297/334 |
| 4,902,069 A | * | 2/1990 | Lehnert ........................ 297/14 |
| 5,707,103 A | * | 1/1998 | Balk ........................... 297/13 |
| 5,941,602 A | | 8/1999 | Sturt et al. |
| 6,082,805 A | * | 7/2000 | Gray et al. ............... 296/65.09 |
| 6,089,651 A | * | 7/2000 | Carmen ..................... 297/16.1 |
| 6,174,017 B1 | * | 1/2001 | Salani et al. ............. 296/65.03 |
| 6,361,098 B1 | * | 3/2002 | Pesta et al. ................ 296/65.03 |
| 6,793,285 B1 | * | 9/2004 | Tame ......................... 297/336 |

FOREIGN PATENT DOCUMENTS

| | | |
|---|---|---|
| EP | 0 588 693 A1 | 3/1994 |
| GB | 2 355 180 A | 4/2001 |
| JP | 63-179248 | 11/1988 |
| JP | 9-118158 A | 5/1997 |
| JP | 2000-62507 A | 2/2000 |
| JP | 2000-189266 A | 7/2000 |

OTHER PUBLICATIONS

International Search Report for PCT/GB02/00732, Date of mailing Jun. 3, 2002, 5 pages.

* cited by examiner

PRESENT INVENTION RELATES TO A VEHICLE SEAT SUPPORT MECHANISM

CROSS-REFERENCE TO RELATED APPLICATIONS

This application is a U.S. nation phase of PCT/GB02/00732 whose disclosure is hereby incorporated by reference in its entirety.

BACKGROUND

The present invention relates to a vehicle seat support mechanism.

SUMMARY

In particular, but not exclusively, one aspect of the present invention relates to a vehicle seat having a seat cushion and a seat back which are movably connected to another by said vehicle seat support mechanism and which are also both movably mounted to a supporting floor by said mechanism.

Preferably the mechanism is arranged to enable the seat cushion to be moved between a normal use position and a stowed position, the seat cushion in its normal use position being located generally horizontally to enable an occupant of the vehicle to sit thereon and in its stowed position being located in an upright orientation.

Preferably on movement of the seat cushion between its normal use and stowed positions, the mechanism is operable to simultaneously move the seat back between an in-use upright position to a stowed upright position. Preferably the in-use upright position and the stowed upright position of the seat back have the same general vertical orientation.

Preferably the seat back, when in its stowed position is located at a lower height than when in its in-use upright position.

Preferably the mechanism includes a support mount adapted to be fixedly mounted on a support floor, such as the vehicle floor, and on each side of the seat, a first link for pivotally connecting the seat back to the mount and a second link for pivotally connecting the seat back to the mount, the seat cushion being fixedly connected to one of said links such that said seat cushion is pivotally connected to said mount by said one link.

According to another aspect of the invention, there is provided a seat assembly for a vehicle, the seat assembly including at least two side by side seats, a first of said seats being movable to a stowed position and a second of said seats being movable rearwardly and inwardly of the vehicle body when said first seat is located in its stowed position.

Various aspects of the present invention are hereinafter described with reference to the accompanying drawings, in which.

BRIEF DESCRIPTION OF THE DRAWINGS

DETAILED DESCRIPTION OF EXEMPLARY EMBODIMENTS

Figure 1:
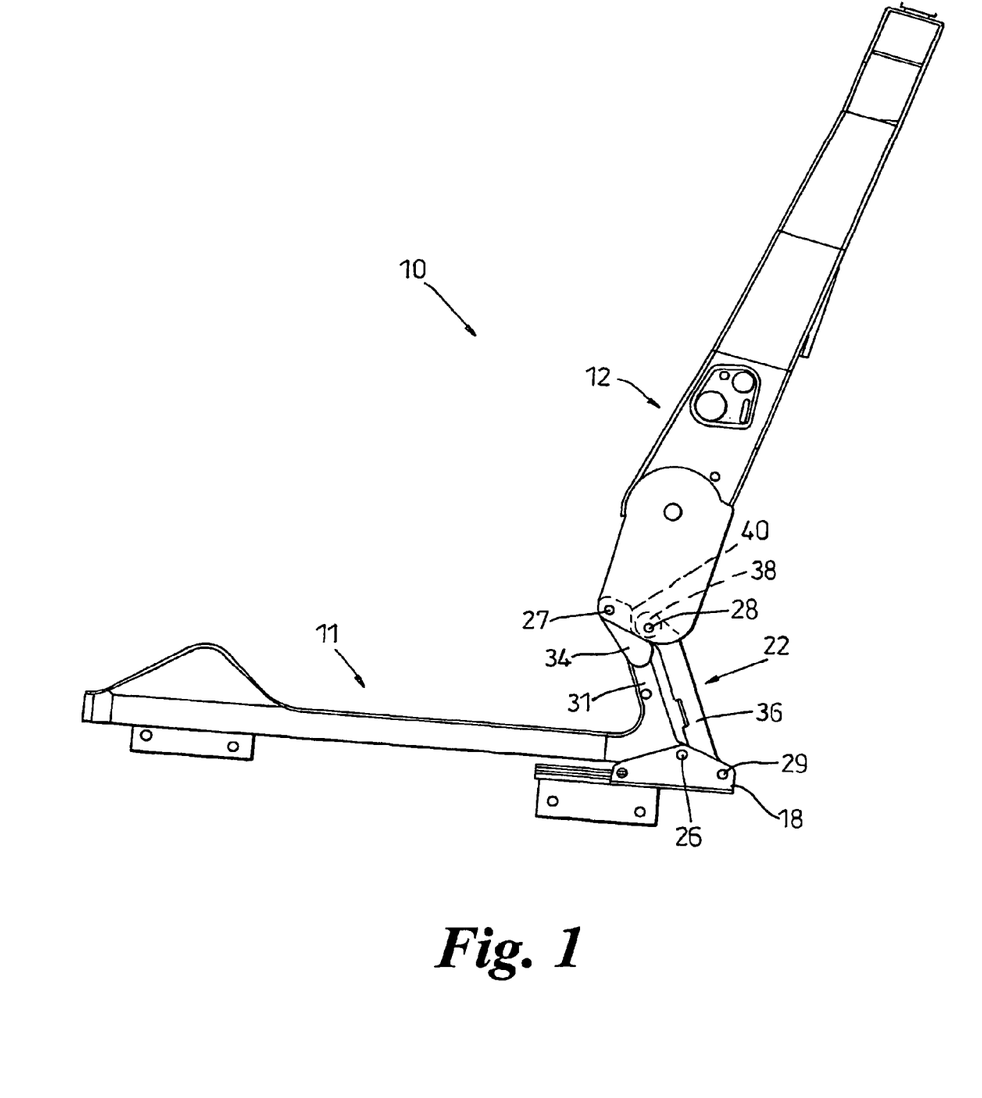
FIG. 1 is a side view of a vehicle seat frame according to an embodiment of the invention, showing its seat cushion in its normal use position.
Figure 2:
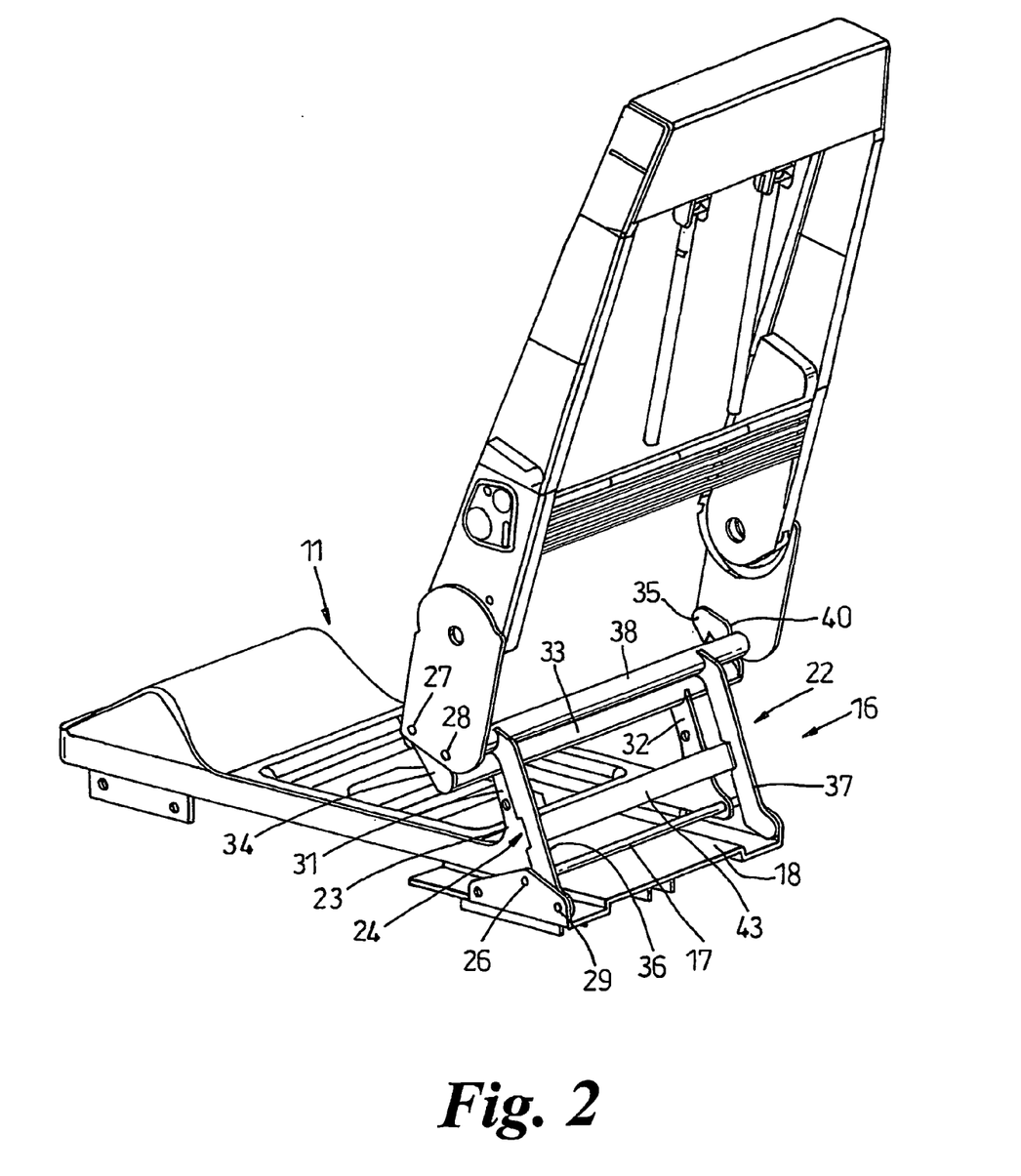
FIG. 2 is a perspective view of the seat frame shown in FIG. 1.

Referring initially to FIG. 1, there is shown a vehicle seat frame 10 having a seat cushion frame 11 and a seat back frame 12. The seat cushion frame 11 and seat back frame 12 are movably connected to one another by a seat support mechanism 16. The mechanism 16 includes a mounting bracket 18 which is normally fixedly attached to the floor (not shown) of the vehicle. The bracket 18 may be detachably fixed to the vehicle floor to enable the entire seat 10 to be removed.

The bracket 18 may be directly fixed to the vehicle floor or may be indirectly fixed to the vehicle floor via a subframe.

On each side of the seat frame 10 there is provided a linkage assembly 22 which serves to pivotally connect the seat cushion frame 11 to the bracket 18 and movably connect the seat back frame 12 to the bracket 18.

As illustrated in FIG. 1, the linkage assembly 22 includes first and second linkage frames 23, 24 respectively which, on each side of the seat, are connected to the seat back frame 12 and bracket by first, second, third and fourth pivotal connections 26, 27, 28 and 29 respectively.

Linkage frame 23 includes a pair of link arms 31, 32 which are fixedly connected at one end to a cross-bar 33 and are each pivotally connected to the bracket 18 at their other end by pivotal connection 26.

Preferably a shaft 17 is provided which extends between link arms 31, 32 to be rotatably received in bracket 18 and thereby define pivotal connection 26 on each side of the seat 10.

The cross-bar 33 is fixedly provided with a pair of link arm extensions 34, 35 which are each pivotally connected to the seat back frame 12 by pivotal connection 27.

Each link arm 31, 32 is fixedly secured to the remainder of the seat cushion frame 11 so that, in effect, the seat cushion frame 11 is pivotally connected to bracket 18 via pivotal connections 26.

Linkage frame 24 includes a pair of link arms 36, 37 which are one end are fixedly secured to a cross-bar 38 and are each pivotally connected to the bracket 18 at their other end by pivotal connection 29. The cross-bar 38 is rotatably received at each end in the seat back frame 12 to thereby define, on each side of the seat, pivotal connection 28.

Figure 3:
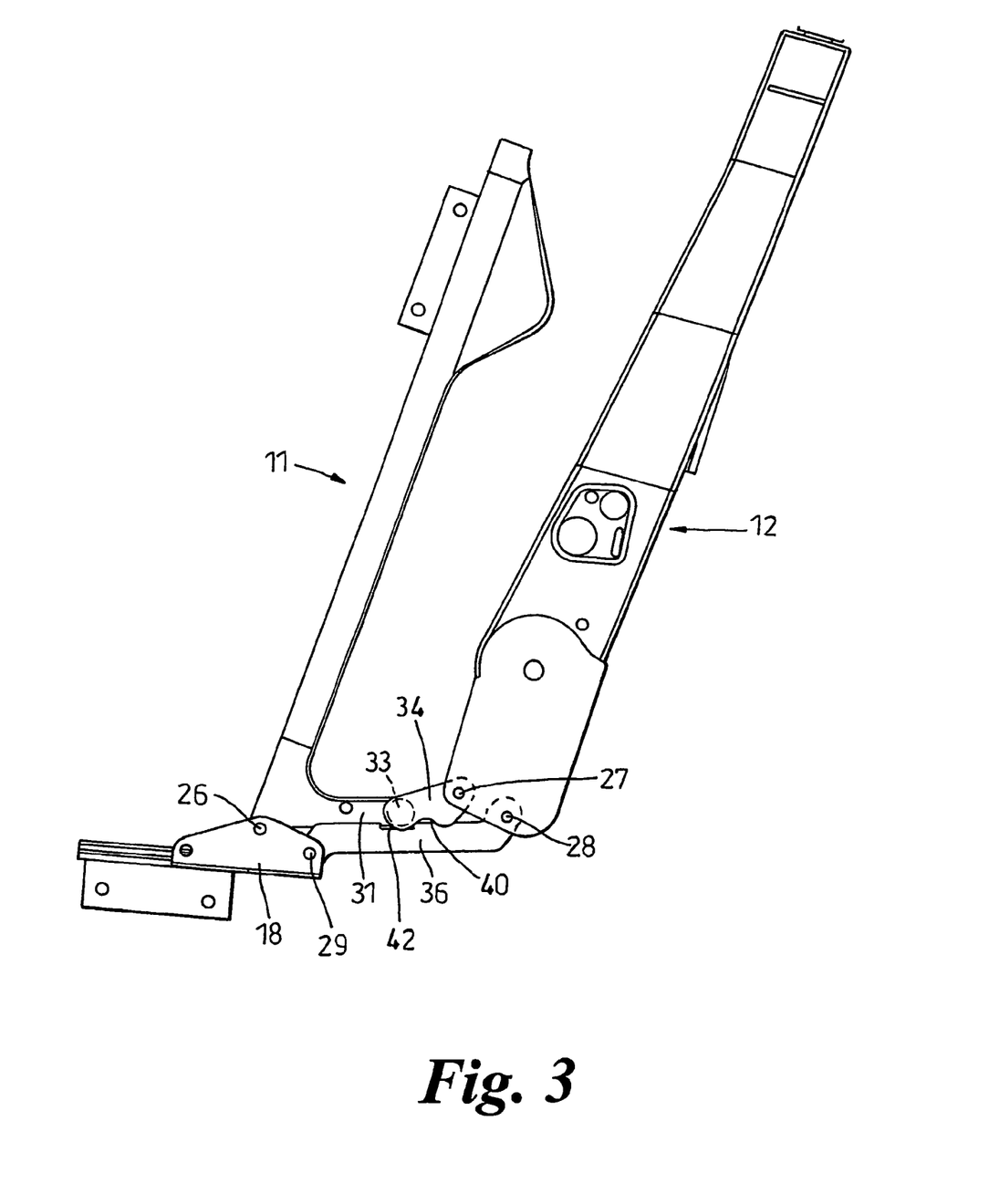
FIG. 3 is a side view of the vehicle seat frame of FIG. 1 showing the seat cushion in its stowed position.
Figure 4:
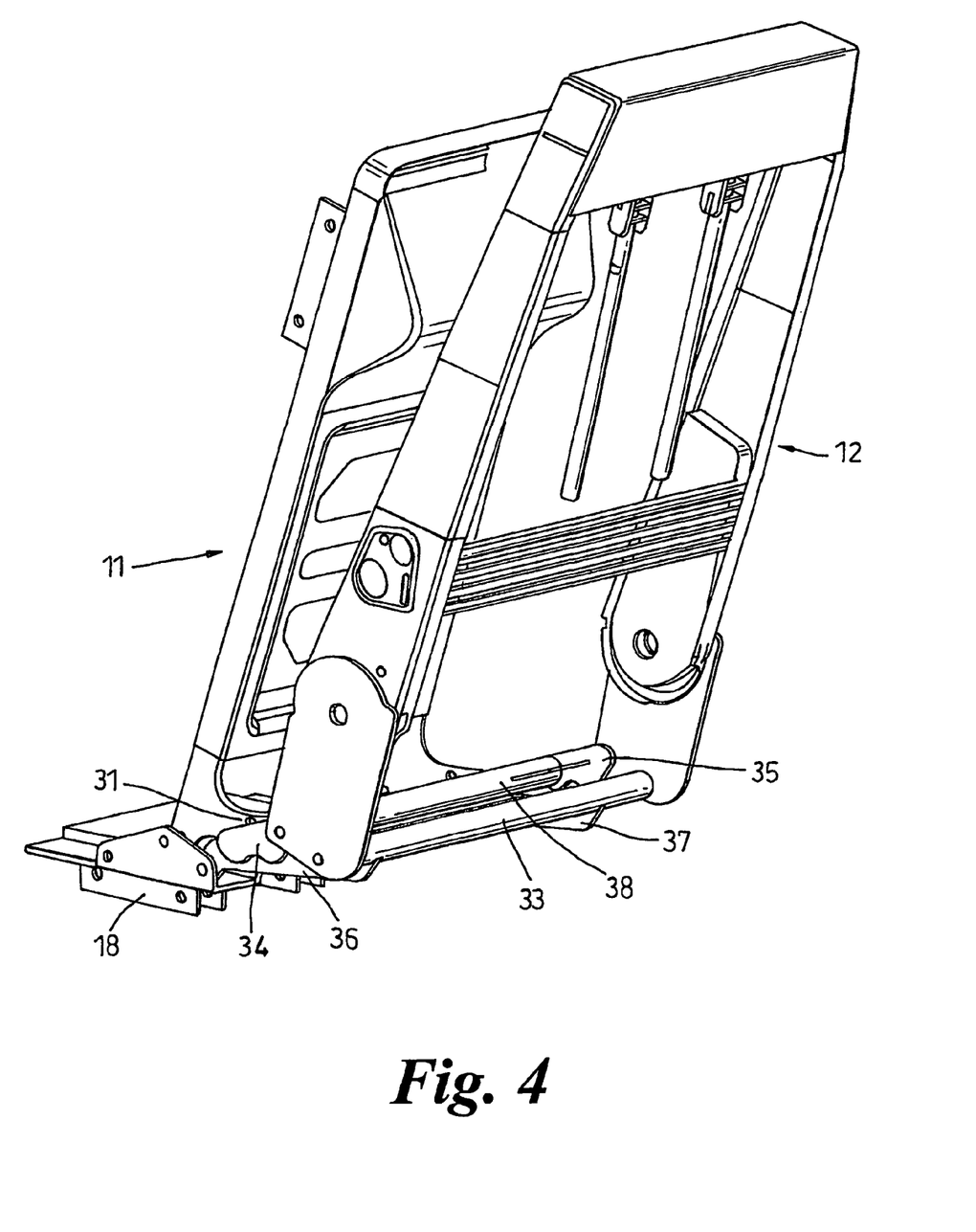
FIG. 4 is a perspective view of the vehicle seat shown In FIG. 3.
Figure 5:
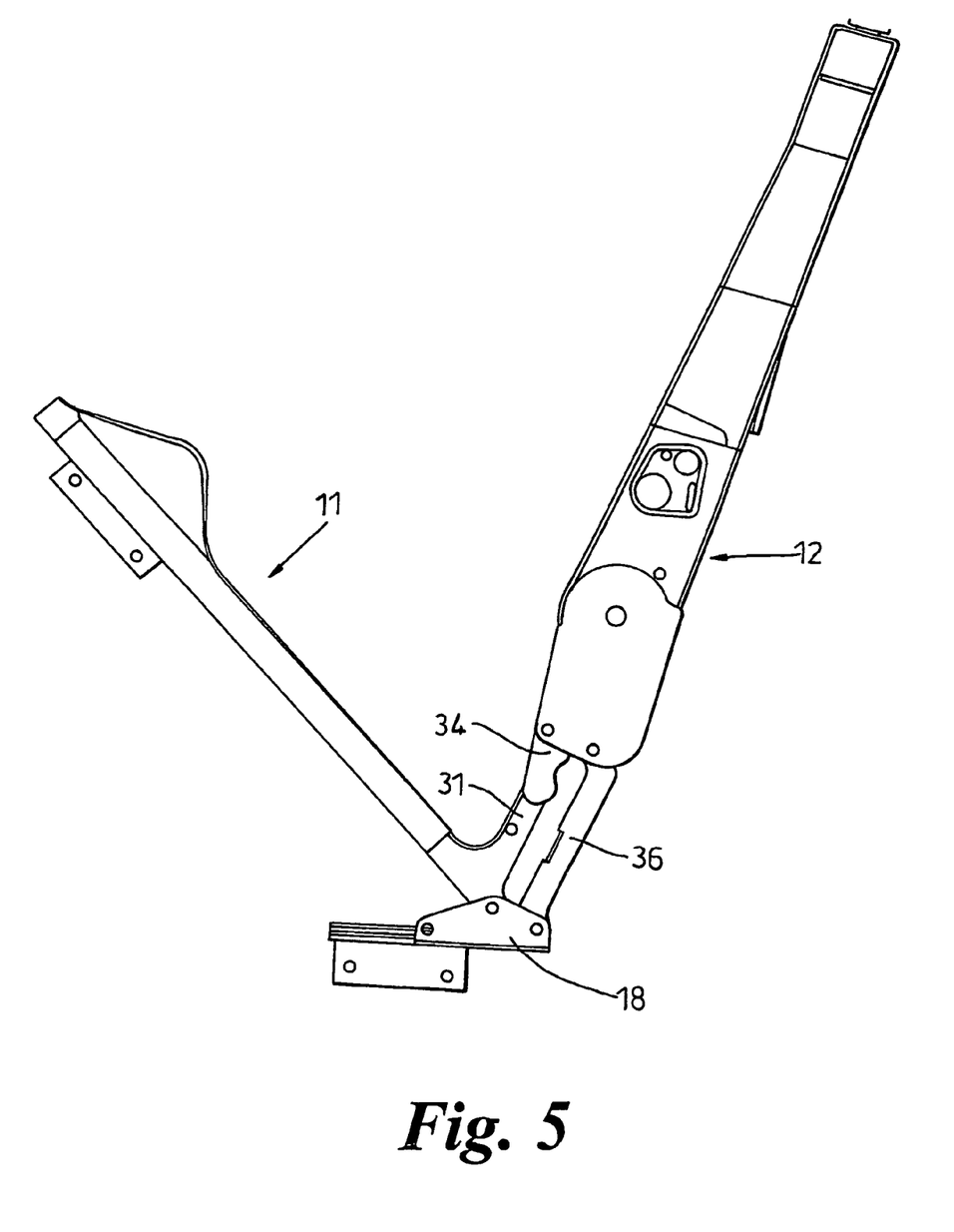
FIG. 5 is a side view of the vehicle seat of FIG. 1 showing the seat cushion at a mid-position between the positions shown in FIGS. 1 and 3.

The linkage frames 23, 24 are arranged so as to abut against one another and thereby define limits pivotal movement of the frames 23, 24 about pivotal connections 26, 29 in both the clockwise and anti-clockwise directions. The limit of pivotal movement in the anti-clockwise direction is shown in FIG. 1 (this defines the normal in-use position of the seat 10) and the limit of pivotal movement in the clockwise direction is shown in FIG. 3 (this defines the stowed position of the seat 10).

Preferably the abutment of the frames 23, 24 in the in-use position of the seat is achieved by cross-bar 38 engaging into a recess 40 formed on each link arm extension 34, 35 and the abutment of cross-bar 33 into a recess 42 formed on each link arm 36, 37. Preferably a reinforcement strut 43 extends between arms 36, 37 in the region of recesses 42.

Preferably, as shown in FIG. 1, the geometric shape defined by pivotal connections 26, 27, 28 and 29 is basically rhomboid with the first and second pivotal connections 26, 27 being located higher than respective pivotal connections 28 and 29.

This enables the seat back frame 12 to remain in generally the same vertical orientation at its normal in-use and stowed positions. In the stowed position, the seat 10 is located at a more rearwards position relative to the front of the vehicle and the seat back frame 12 is also located at a lower height.

Thus, if the seat 10 is located at the rear of a vehicle having a parcel shelf extending across the rear of the seat when in its normal in-use position, it is possible by pivotally deflecting the seat cushion from 11 (in the clockwise direction) to move the seat 10 rearwardly and downwardly to its stowed position which, conveniently may be located beneath the parcel shelf.

The seat 10 of the present invention may conveniently be incorporated in a seat assembly 100, as shown in FIGS. 6 to 9, which enables the seat assembly 100 to be converted between 2-seater and 3-seater conditions.

Figure 6:
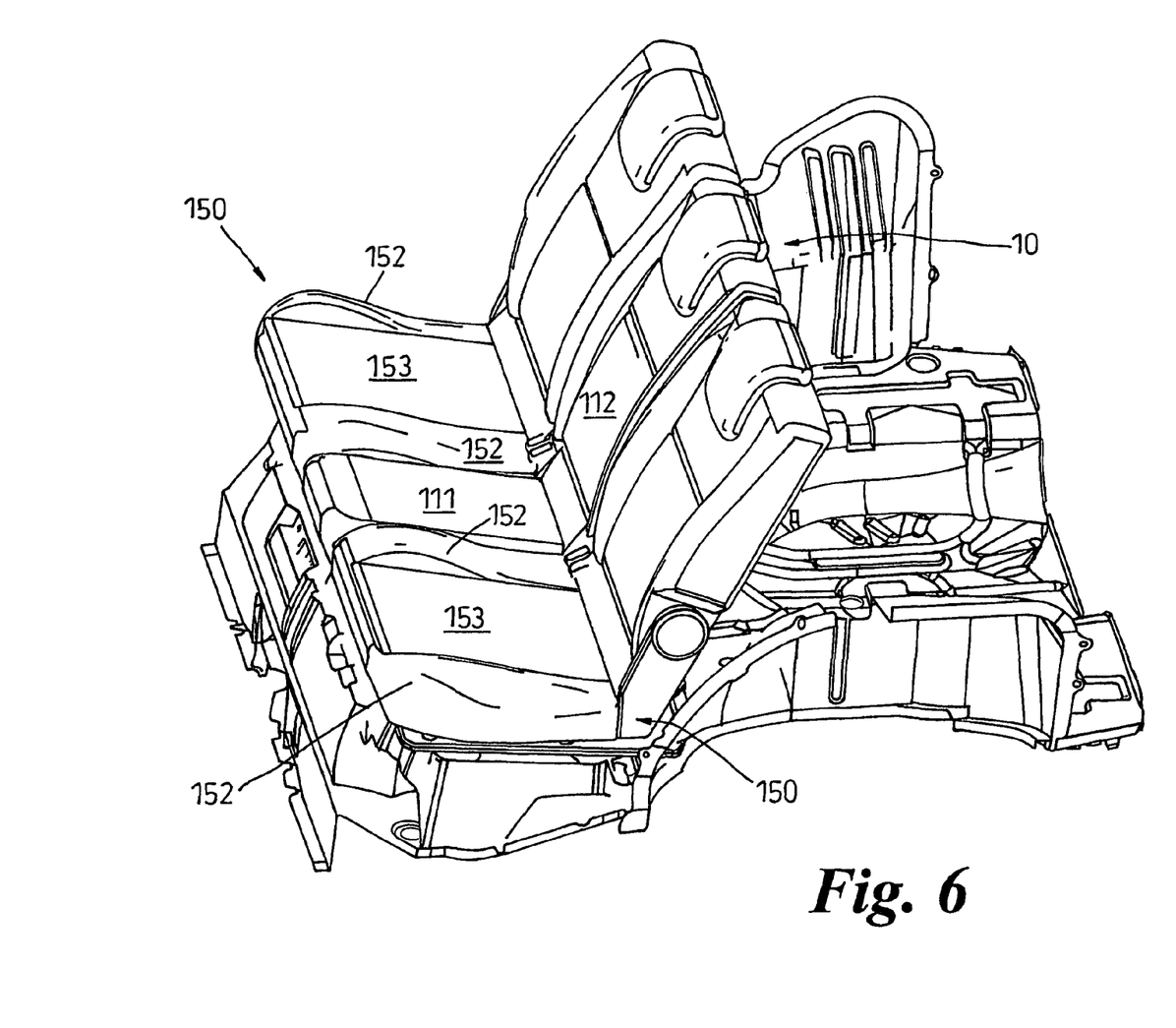
FIG. 6 is a perspective view of a seat assembly according to an embodiment of the present invention shown in its 3-seater condition.
Figure 7:
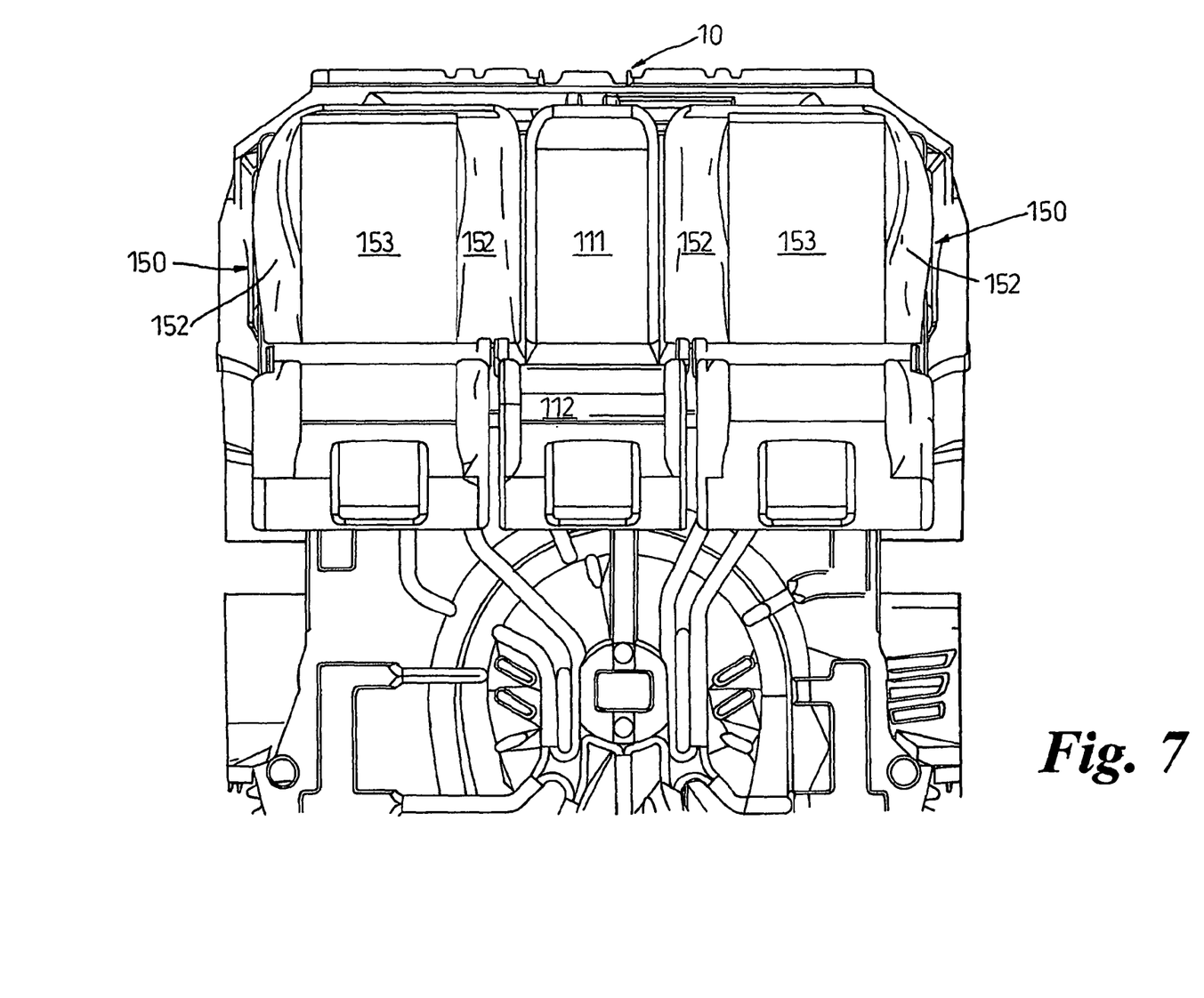
FIG. 7 is a plan view of the seat assembly as shown in FIG. 5

As shown in FIGS. 6 and 7, the seat 10 is located in its normal in-use position.

The seat 10 has a seat cushion 111 carried by its seat cushion frame 11 and a seat back 112 carried by its seat back frame 12.

On either side of the seat 10 there is provided an outboard seat 150.

Each seat 150 includes a seat cushion 151 having a pair of holsters 152 located on either side of a control seat zone 153.

The seat cushion 111 preferably is provided with no holsters and has a width which is less than the width of its seat back 112. Thus, when the seat 10 is moved to its stowed position, outer marginal regions of the seat back 112 define shoulders 155 (see FIGS. 6, 7).

The seats 10, 150 as shown in FIGS. 6 and 7 are located at a forwardmost position.

Figure 8:
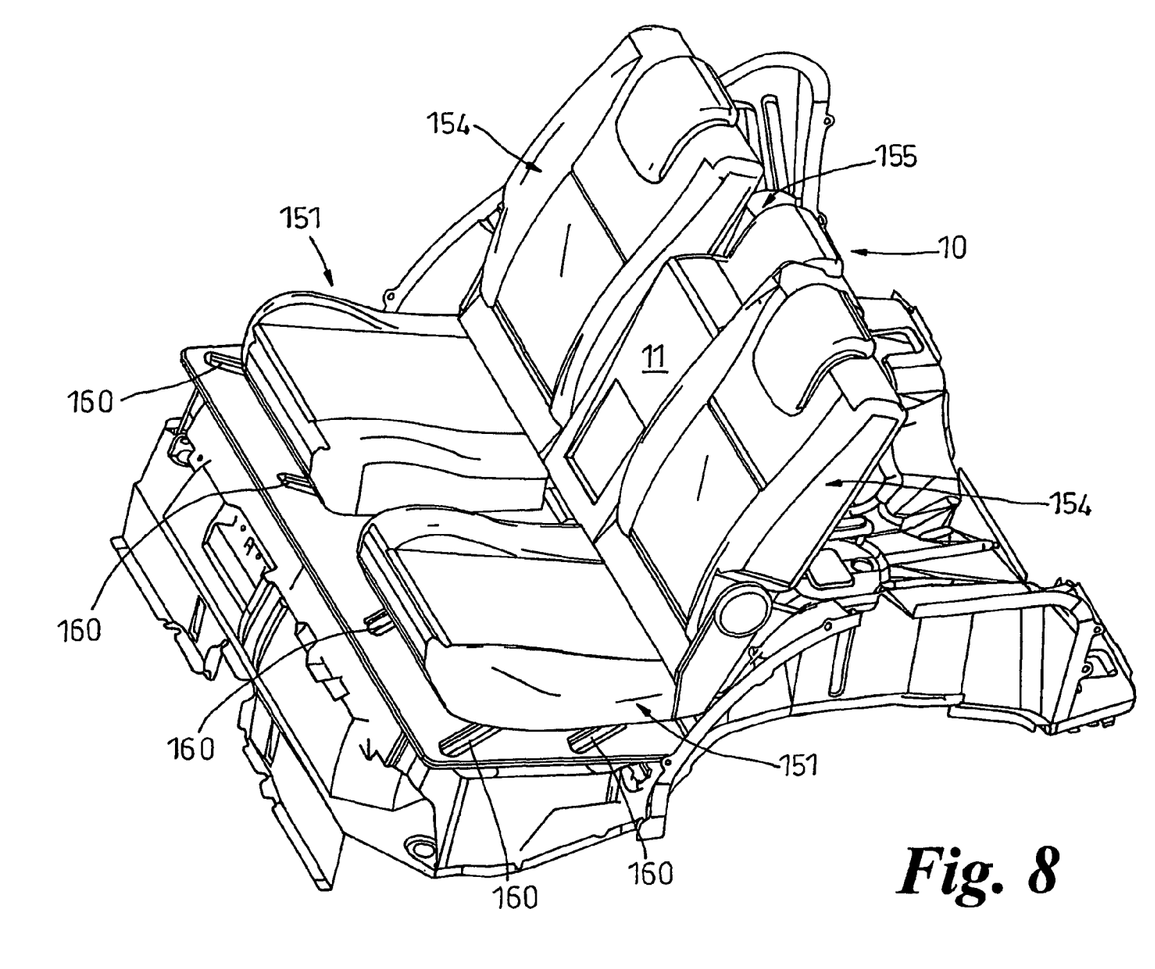
FIG. 8 is a perspective view of the seat assembly of FIG. 5 shown in its 2-seater condition.
Figure 9:
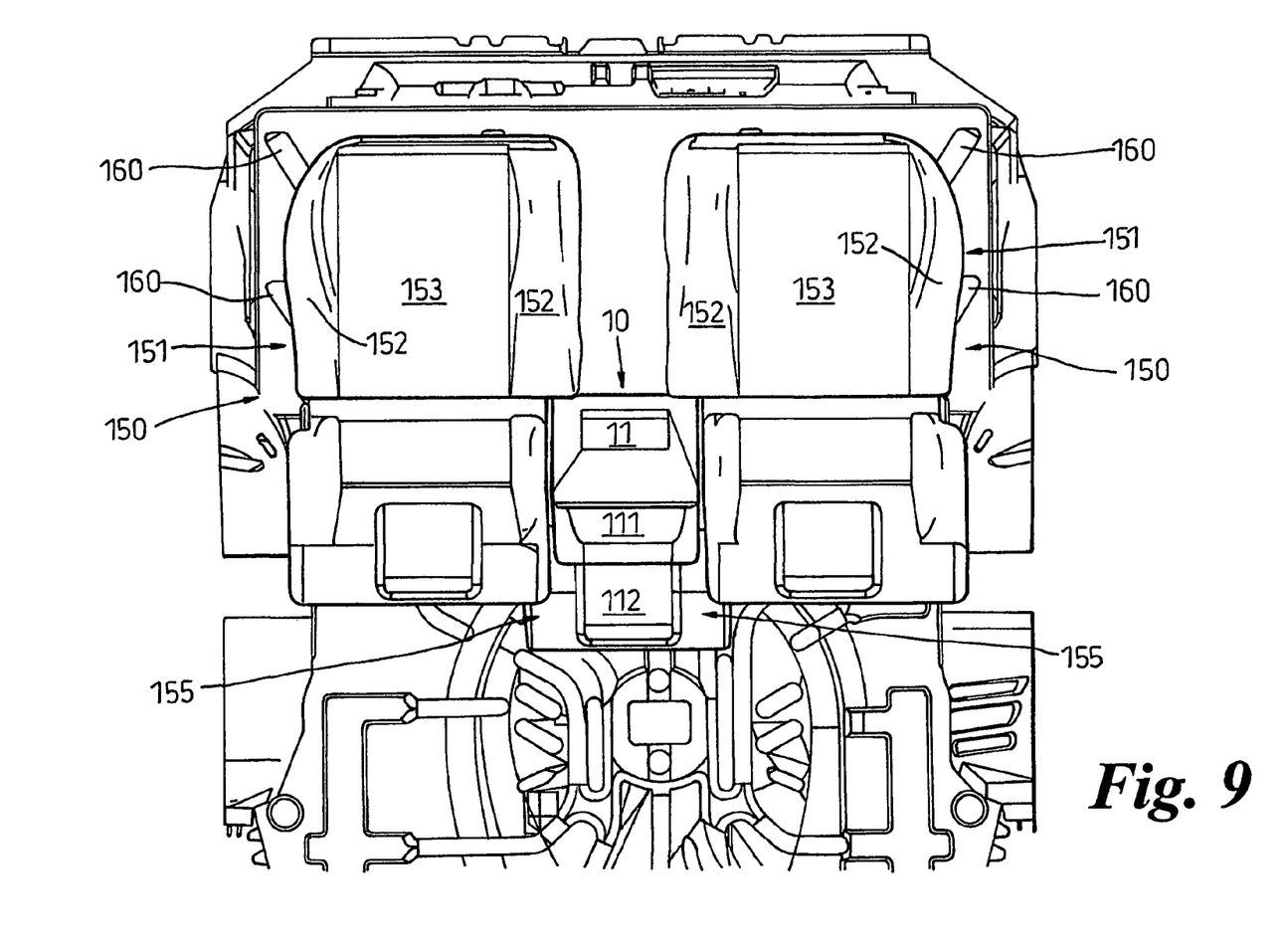
FIG. 9 is a plan view of the seat assembly as shown in FIG. 7.

To convert the seat assembly 100 from a 3-seater condition to a 2-seater condition, the seat 10 is first moved to its stowed position. This is illustrated in FIGS. 8 and 9. In reaching this position, seat 10 has moved rearwardly and downwardly.

Seats 150 are each movably mounted, preferably on rails 160, so as to be movable to a rearmost and innermost position relative to the vehicle body. This position is also shown in FIGS. 6 and 7.

Preferably in the rearmost-innermost position of seats 150, the seats 150 are located slightly forward of seat 10 with their seat backs 154 overlapping shoulders 155. This enables seats 150 to positively retain seat 10 in its stowed position.

When the seats 150 are located in their rearmost-innermost position, they provide the occupants of those seats with more legroom and also more shoulder room.

The invention claimed is:

1. A vehicle seat comprising:
   a seat cushion; and
   a seat back,
   wherein the seat cushion and seat back are movably connected to one another by a vehicle seat support mechanism and are movably mounted to a support floor by said vehicle seat support mechanism,
   wherein said vehicle seat is movable between a normal in-use position and a stowed position,
   wherein said stowed position is located rearwards from said normal in-use position,
   wherein said seat back, when said vehicle seat is in its stowed position, is located at a relatively lower height than when said vehicle seat is in said normal in-use position,
   wherein said vehicle seat support mechanism includes a support mount adapted to be fixedly mounted on said support floor, and further includes first and second links on each side of said seat, each of the first and second links being pivotally connected to both the seat back and the support mount to pivotally connect said seat back to said support mount, said seat cushion being fixedly connected to one of said links on each side of said seat such that said seat cushion is pivotally connected to said support mount by said one of said links.

2. A vehicle seat as claimed in claim 1 wherein during movement of said vehicle seat between said normal in-use position and said stowed position, said seat cushion is movable between a normal use position and a stowed position respectively, the seat cushion in said normal use position being located generally horizontal and in said stowed position being located in a generally upright orientation.

3. A vehicle seat as claimed in claim 2 wherein on movement of said seat cushion between its normal use and stowed positions, said vehicle seat support mechanism is operable to simultaneously move said seat back between an in-use upright position and a stowed upright position.

4. A vehicle seat as claimed in claim 3 wherein said in-use upright position and said stowed upright position of said seat back have the same general vertical orientation.

5. A vehicle seat as claimed in claim 1, wherein each of the first and second links comprises a single unitary member.

\* \* \* \* \*

UNITED STATES PATENT AND TRADEMARK OFFICE
CERTIFICATE OF CORRECTION

| | | |
|---|---|---|
| PATENT NO. | : 7,815,258 B2 | Page 1 of 1 |
| APPLICATION NO. | : 10/468972 | |
| DATED | : October 19, 2010 | |
| INVENTOR(S) | : Huxter et al. | |

It is certified that error appears in the above-identified patent and that said Letters Patent is hereby corrected as shown below:

Item (54) & Col. 1 line 1 the title should read:

-- (54) FOLDABLE VEHICLE SEAT FROM A USE POSITION TO A STOWED POSITION AND RELATED LAYOUT OF A SEAT ASSEMBLY --

Signed and Sealed this
Tenth Day of May, 2011

David J. Kappos
*Director of the United States Patent and Trademark Office*